United States Patent
Defilippis et al.

(10) Patent No.: US 8,107,584 B2
(45) Date of Patent: Jan. 31, 2012

(54) APPARATUSES AND METHODS FOR DAMPING NUCLEAR REACTOR COMPONENTS

(75) Inventors: Michael S. Defilippis, Wilmington, NC (US); James P. Carneal, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 130 days.

(21) Appl. No.: 12/149,642

(22) Filed: May 6, 2008

(65) Prior Publication Data

US 2009/0279656 A1  Nov. 12, 2009

(51) Int. Cl.
*G21C 19/00* (2006.01)
(52) U.S. Cl. .......................... 376/260; 376/372; 376/461
(58) Field of Classification Search .................. 376/260, 376/372, 461
See application file for complete search history.

(56) References Cited

U.S. PATENT DOCUMENTS

| | | | | |
|---|---|---|---|---|
| 2,983,659 A * | 5/1961 | Treshow | | 376/272 |
| 2,994,655 A * | 8/1961 | Taylor, Jr | | 376/234 |
| 3,007,712 A * | 11/1961 | Moulton et al. | | 280/104 |
| 3,060,111 A * | 10/1962 | Sherman et al. | | 376/175 |
| 3,280,206 A * | 10/1966 | Scola et al. | | 585/866 |
| 3,700,550 A | 10/1972 | Shiells | | |
| 3,980,519 A * | 9/1976 | Taft | | 376/225 |
| RE29,221 E * | 5/1977 | Yang | | 188/1 |
| 4,099,602 A * | 7/1978 | Kourbetsos | | 188/300 |
| 4,638,895 A * | 1/1987 | Taylor et al. | | 188/280 |
| 4,700,815 A * | 10/1987 | Persicke et al. | | 188/286 |
| 4,815,574 A * | 3/1989 | Taylor et al. | | 188/280 |
| 5,089,218 A * | 2/1992 | Gardner et al. | | 376/406 |
| 5,487,454 A * | 1/1996 | Klembczyk et al. | | 188/298 |
| 5,978,433 A | 11/1999 | Erbes et al. | | |
| 6,216,831 B1 * | 4/2001 | Taylor | | 188/280 |
| 6,311,962 B1 * | 11/2001 | Marking | | 267/64.25 |
| 6,345,707 B1 * | 2/2002 | Klembczyk | | 188/298 |
| 6,633,624 B1 | 10/2003 | Ito et al. | | |
| 2005/0271182 A1 | 12/2005 | Somerville | | |

\* cited by examiner

*Primary Examiner* — Ricardo Palabrica
(74) *Attorney, Agent, or Firm* — Harness, Dickey & Pierce

(57) ABSTRACT

Example embodiment damping devices may include a housing capturing a piston. The housing may be filled and/or able to be filled with a damping fluid compatible with the nuclear reactor coolant, so that a leak from the housing or coolant passing into the housing does not damage the reactor or example embodiment devices. Example embodiments may further include one or more springs that provide an elastic force opposing movement between the piston and housing. A shaft of the piston and an end of the housing may be connected to two nuclear reactor components with relative motion or vibration to be damped. Example methods may use example embodiment damping devices to reduce and/or prevent relative motion and vibration among components of a nuclear reactor.

10 Claims, 5 Drawing Sheets

APPARATUSES AND METHODS FOR DAMPING NUCLEAR REACTOR COMPONENTS

BACKGROUND

1. Field

Example embodiments generally relate to mechanical damping devices and methods in nuclear reactor environments.

2. Description of Related Art

Mechanical damping devices may be used to reduce or damp vibration in a single component and/or reduce or damp vibration and relative movement between multiple components. Conventional mechanical damping devices may employ elastic components, such as springs, that provide a restorative force between two components as the components vibrate, thereby reducing and damping such vibration. Additionally, conventional mechanical damping devices may employ frictional or inelastic components, such as high-viscosity fluids, that provide an opposing force to any movement between two components as the components vibrate, thereby damping such vibration.

Nuclear reactors and associated operating components may be subject to vibration and relative oscillation among components, due to several moving parts, such as motors, valves, turbines, etc., and high-pressure, high-velocity coolant flowing, and potentially boiling, therein. Reactor operating conditions typically include high levels of radioactivity, due to fission occurring in the fuel rods, corrosion and material damage. Radioactivity and corrosion degrades the material strength and elasticity of core components over time. Accordingly, vibration and lengthy operating cycles coupled with radiation can cause reactor components to fail.

SUMMARY

Example embodiments are directed to apparatuses and methods that may damp and/or reduce vibration between nuclear reactor components. Example embodiment devices may connect between two components in a nuclear reactor and damp vibration and/or relative movement between the two components. Example embodiments may use reactor coolant or a fluid compatible therewith as a damping fluid to damp vibration and/or relative movement between two components.

Example embodiment damping devices may include a housing capturing, retaining, framing, and/or otherwise housing a piston. The housing may be filled and/or be able to be filled with a damping fluid compatible with the nuclear reactor coolant, so that a leak from the housing or coolant passing into the housing does not damage the reactor or example embodiment devices. Damping is provided by the relative motion of the piston and housing, which will push the damping fluid through a fluid passage that can be either in the housing and/or the piston. Example embodiments may further include one or more springs that provide(s) an elastic force that opposes movement between the piston and housing. A shaft of the piston and an end of the housing may be connected to two nuclear reactor components with relative motion or vibration to be damped.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Figure 1:
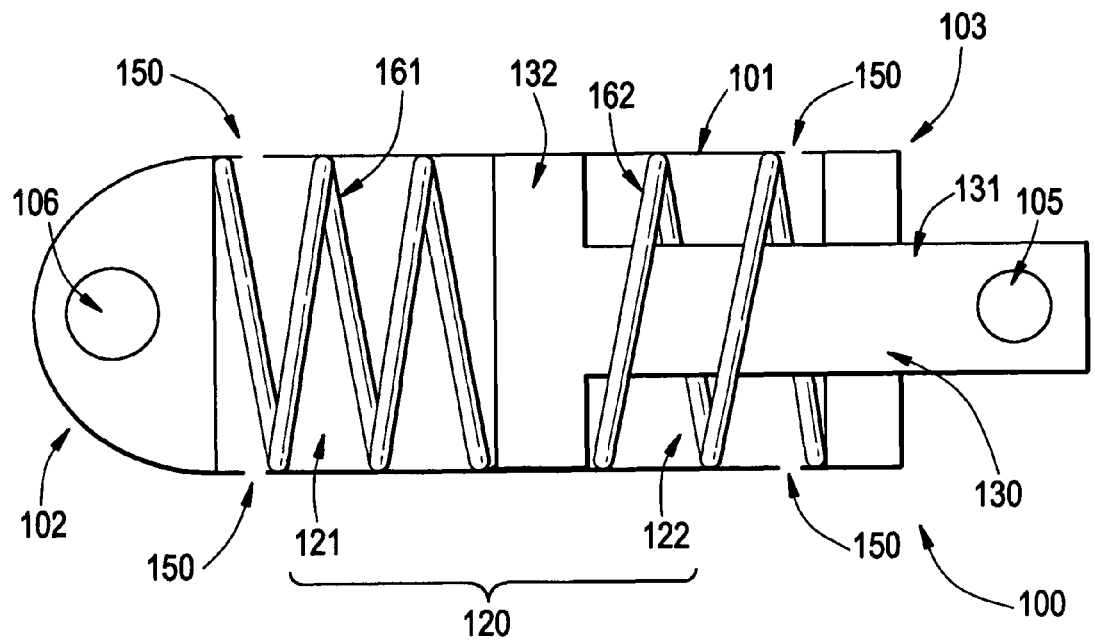
FIG. 1 is an illustration of an example embodiment damping device.

Detailed illustrative embodiments are disclosed herein. However, specific structural and functional details disclosed herein are merely representative for purposes of describing example embodiments. The example embodiments may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially and concurrently or may sometimes be executed in the reverse order, depending upon the functionality/acts involved.

The inventors of the present disclosure have recognized that the unique environment within a nuclear reactor may not be conducive to the use of conventional damping mechanisms and methods on components subject to that environment. The combination of radioactivity, strict coolant chemistry requirements, high temperatures, and high fluid flow rates may destroy or degrade conventional snubber- or spring-type damping devices. Further, fluid-based inelastic damping devices, which may use high-viscosity fluids such as oil, may present an unacceptable risk of chemical incompatibility and damage if the damping fluid should leak or otherwise become exposed to the coolant.

The inventors of the present disclosure have further recognized that several components within a nuclear reactor may benefit from vibration damping, because of vibration-related damage, component-on-component abrasion, and resulting component replacement. The combination of extreme-temperature, pressure, and radiation-induced brittling present in a nuclear reactor may make nuclear reactor components particularly susceptible to damage because of variable and extreme vibration between components and the wear between contacting components from such vibration.

FIG. 1 is an illustration of an example embodiment damping device 100 that may be useable to damp vibration between two components inside an operating nuclear reactor. Example embodiment damping device 100 includes a housing 101 that may generally frame and/or house other elements of the device 100. Housing 101 may be generally tubular and/or cylindrical; however, other shapes, such as tetrahedral, oval, elliptical, etc., may be used based on the particular sizing and shaping needs of the application for example embodiment damping device 100.

Housing 101 may be substantially hollow, with the exception of a mounting end 102 and/or shaft end 103. Mounting end 102 may be substantially solid to provide material strength sufficient for joining to a desired nuclear reactor component to be damped via, for example, a first mounting hole 106. First mounting hole 106 may be any size or shape to facilitate a secure direct and/or indirect attachment to the desired component. For example, first mounting hole 106 may be generally cylindrical and threaded to permit a bolt or screw to pass therethrough and attach example embodiment device 100 to a desired component. Alternately, a latching, lock-and-key, or other joining mechanism may permit mounting end 102 to be securely connected to the desired component.

Although mounting end 102 and mounting hole 106 are shown in FIG. 1 at an end of the housing 101, mounting end 102 may be placed at any desired position about housing 101, depending on the location and orientation of the component to be damped. For example, mounting end 102 may be in the form of a tab extending transversely from a side of housing 101 and/or may include a mounting hole 106 and/or other joining mechanism to attach to a nuclear reactor component at a position transversely spaced from housing 101. Mounting end 102 may be shaped with thickness and/or other support to enable connection integrity between a component attached thereto and example embodiment device 100.

Housing 101 generally frames and/or contains a fluid chamber 120 and a piston 130. Piston 130 may include at least one shaft 131 and at least one head 132 captured within the housing 101. Piston head 132 may divide the fluid chamber 120 into two separate chambers—first fluid chamber 121 and second fluid chamber 122. To provide for such division, a perimeter of the piston head 132 may meet or touch housing 101 along a substantial length of the piston head perimeter. Piston head 132 may be any shape and/or may be sized based on the configuration of housing 101 in order to provide for such division.

Housing 101 has a shaft end 103 having a hole or other passage through which shaft 131 of piston 130 may pass. Shaft end 103 may abut shaft 131 as shown in FIG. 1 or may have spacing from shaft 131 that may permit fluid to pass between fluid chamber 120 to/from an environment surrounding example embodiment device 100. Shaft end 103 may further include ball bearings, bushings, lubricant, or other mechanisms that permit low-friction movement of shaft 131 through shaft end 103. Shaft end 103 may be further sized and/or shaped to act as a capture for piston 130; that is, shaft end 103 may permit piston 130 to move within housing 101 but not completely leave housing 101. For example, a hole in shaft end 103 may be sized smaller than the size of piston head 132 to prevent piston head 132 from passing outside the housing 101.

Shaft 131 of piston 130 may include a second mounting hole 105 that permits example embodiment damping device 100 to be connected to another chosen component. Although second mounting hole 105 is shown at an end of shaft 131 in FIG. 1, second mounting hole 105 and/or shaft 131 may be alternatively oriented in order to connect to another chosen component. For example, shaft 131 may have an elbow and/or extend in a different direction to connect to a desired component, and hole 105 may be placed at any position along shaft 131, or not used. Shaft 131 may be substantially solid to provide material strength sufficient for joining to a desired nuclear reactor component to be damped via, for example, a second mounting hole 105. Second mounting hole 105 may be any size or shape to facilitate a secure direct and/or indirect attachment to the other desired component. For example, second mounting hole 105 may be generally cylindrical and threaded to permit a bolt or screw to pass therethrough and attach example embodiment device 100 to a second desired component. Alternately, a latching, lock-and-key, or other joining mechanism may permit shaft 131 to be securely connected to the other desired component.

Housing 101 further includes at least one fluid passage 150. Fluid passages 150 may be bores or other apertures in housing 101 that permit a fluid to pass into and/or out of at least one of the first and second fluid chambers 121 and 122 to the environment surrounding example embodiment damping device 100. Fluid passages 150 may be any shape or size, so as to retain the structural integrity of housing 101 and permit some fluid flow therethrough. Although FIG. 1 may appear to show fluid passages 150 separating the housing 101, this appearance is due to the particular profile view of the example device 100 in FIG. 1. Housing 101 is continuous and rigid at other profiles, such that housing 101 forms a single rigid body including mounting end 102 and shaft end 103.

Example embodiment damping device 100 may further include a first spring 161 and/or second spring 162 within housing 101. First and/or second springs 161/162 may be positioned within first and second fluid chambers 121 and 122, respectively. First spring 161 may be coupled between piston head 132 and mounting end 102 within the first fluid chamber 121 so as to provide elastic resistance to any relative movement between piston head 132 and mounting end 102. Similarly, second spring 162 may be coupled between piston head 132 and shaft end 103 so as to provide elastic resistance to any relative movement between piston head 132 and shaft end 103. Springs 161 and 162 may take on a variety of forms offering elastic, restorative force between the piston 130 and housing 101, including known coil springs and solid elastic bar members. Springs 161 and 162 may be used singly, in combination, or not at all.

By rigidly connecting mounting end 102 and shaft 130 to first and second components within a nuclear reactor environment, example embodiment damping device 100 may prevent relative movement between the first and second components and damp vibration therebetween. The components in an operating nuclear reactor may be surrounded by coolant subject to the chemistry requirements discussed above. Coolant may flow through one or more fluid passages 150 into/from first and/or second fluid chambers 121/122 when piston 132 moves within housing 101 and thereby damp movement of piston 130 within housing 101. In this way, the first and second components attached to device 100 may be subject to fluid, inelastic damping between the housing 101 and piston 130, without the use of a high-viscosity fluid damping medium, such as oil, that is not permitted in an operating nuclear reactor environment.

Further, because example embodiment devices may be surrounded by coolant usable as a fluid in fluid chamber 120, example embodiments may not require refilling or related maintenance for damping fluids. Additionally, any gasses that may accumulate within fluid chamber 120 as a result of phase change or as radioactive decay products may readily exit the housing 101 through fluid passages 150 without damaging example embodiment damping device 100.

Further, fluid passages 150 may be sized and positioned to permit coolant to flow therethrough at a desired rate. By making passages 150 smaller or not present in particular fluid chambers of the housing 101, movement of piston 130 within housing 101 and relative motion and vibration of components attached to example device 100 may be further subject to hydraulic damping and resistance to relative movement between components. Even further, springs 161 and/or 162 may provide further elastic damping and resistance to relative movement between components attached to example device 100. A person skilled in the art having read this disclosure and knowing the types and frequency of component vibration and wear may properly select and modify the fluid passages 150 and springs 161/162 in order to provide adequate damping and damping types to nuclear reactor components that may otherwise move, vibrate, and wear relative to each other.

Example embodiment damping devices are fabricated from materials that substantially maintain their physical properties when exposed to an operating nuclear environment and perform the tasks of the structures described above. For example, rigid materials having minimal corrosion likelihood and small nuclear cross-sections may be selected to fabricate the elements described above. For example, stainless steel, aluminum alloys, zirconium, zirconium alloys, and/or nickel-based alloys may be used to fabricate any or all of the parts described above. In this way, example embodiment devices may provide damping and support between components over an entire operating cycle or longer without being replaced or, worse, degrading and damaging the operating nuclear reactor due to material failure in the harsh operating reactor environment.

Figure 2:
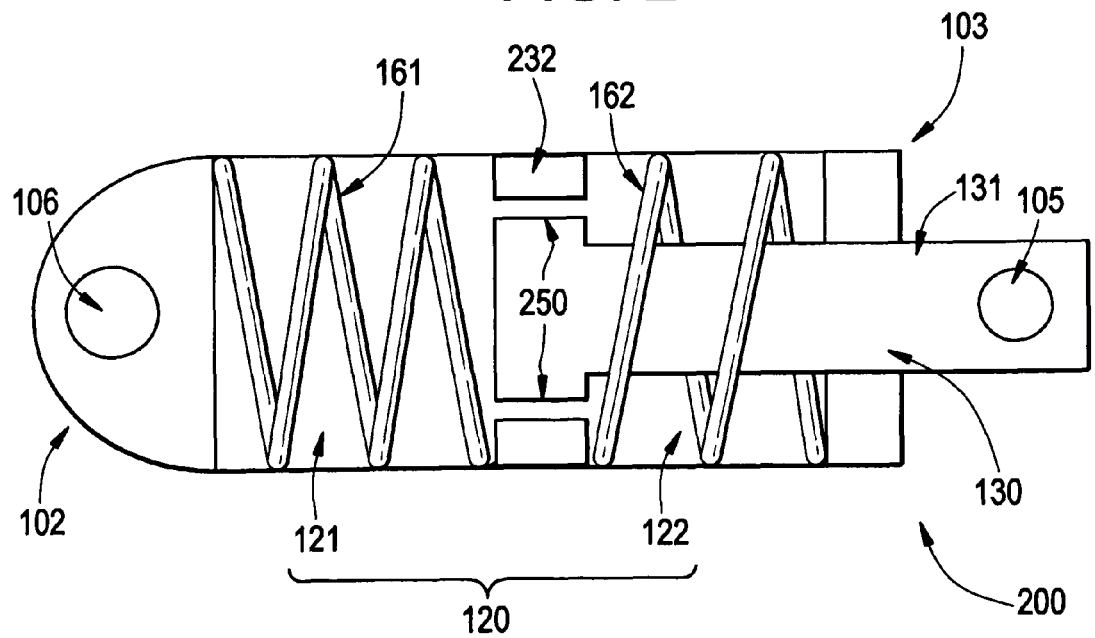
FIG. 2 is an illustration of another example embodiment damping device.

FIG. 2 is an illustration of another example embodiment damping device 200. Example embodiment damping device 200 may possess redundant features with the same numbering to those features of example embodiment damping device 100, whose redundant description is omitted. As shown in FIG. 2, example device 200 may include no fluid passage in housing 201 and/or include fluid passages 250 in the head 232 of piston 130. Fluid passages 250 may be shaped and positioned in head 232 to permit fluid to pass between fluid chambers 121 and 122 as piston 130 moves within the housing 201. By properly shaping passages 250, movement of piston 130 within housing 201 and components attached to example device 200 may be subject to hydraulic damping and resistance to relative movement between components. For example, reducing the size of fluid passages 250 may increase the frictional forces on fluids passing therethrough, providing greater hydraulic resistance to movement of piston 130 within housing 201 and damping vibration of components attached to example embodiment damping device 200.

Any fluid used within chambers 121 and 122 may be compatible with nuclear reactor coolant, and/or may be actual coolant material, such that any leak or failure in example embodiment damping device 200 will not damage or destroy reactor components exposed to the fluid used. Further, fluid chamber 120 may not require maintenance or refilling in the case of a leak if example embodiment damping device 200 is immersed in reactor coolant useable as a damping fluid. In this way, example embodiment damping device 200 may be useable in an operating nuclear reactor environment without failure or threat of damage to components therein.

Figure 3:
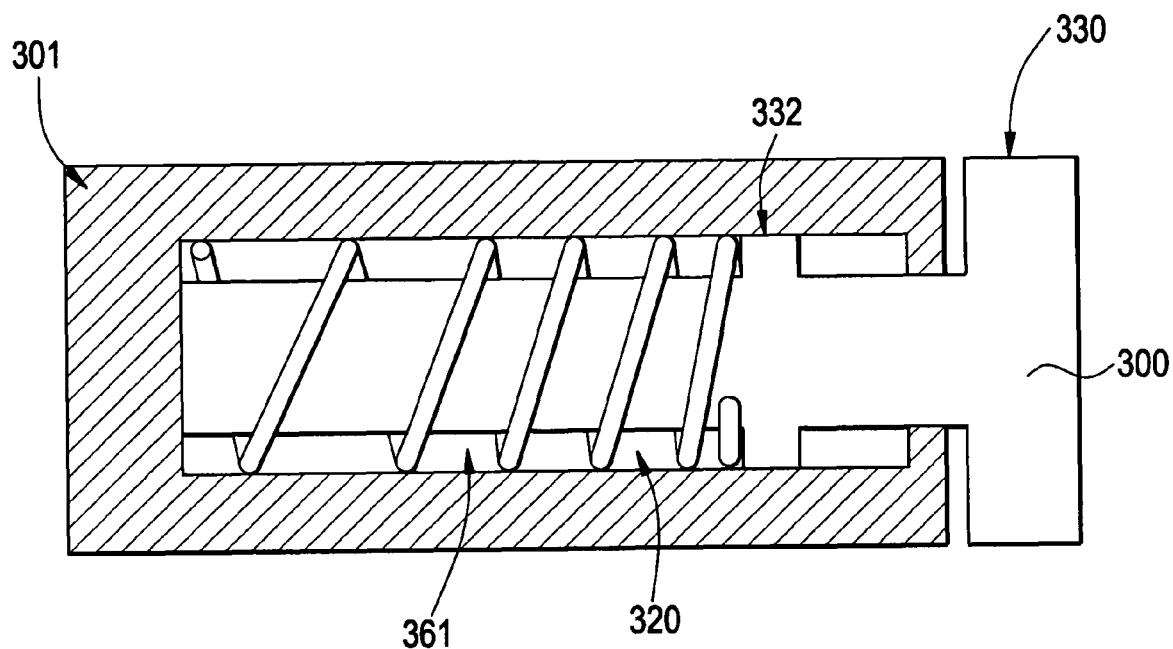
FIG. 3 is an illustration of yet a further example embodiment damping device.

FIG. 3 is an illustration of a further example embodiment damping device 300. Example embodiment damping device 300 may possess redundant features to those of example embodiment damping devices 100 and 200, whose redundant description is omitted. As shown in FIG. 3, example embodiment damping device 300 may reside within a component 301 to be damped. Component 301 may be any component found within an operating nuclear reactor needing damping or movement resistance, including, for example, a BWR jet pump assembly set screw, BWR jet pump sensing line support, or steam dryer support assembly.

A fluid chamber 320 may be present or hollowed out of component 301 by an appropriate drilling or machining process. Chamber 320 may have a variety of shapes and sizes depending on the position within the selected component and overall component size, including, for example, a cylindrical bore as shown in FIG. 3. Fluid chamber 320 may house a piston 330 that may move within fluid chamber 320. Piston 330 may further include a capture 332 shaped to prevent piston 330 from passing entirely out of chamber 320.

Chamber 320 may be filled with a fluid that may provide damping to piston 330 by frictionally opposing motion of piston 330 and/or capture 332 within chamber 320. Similarly as described above, the fluid used in chamber 320 may be compatible with nuclear reactor coolant and/or may be coolant itself, such that in the case of leakage, damage to nuclear reactor components may be prevented or reduced. Additionally, chamber 320 may require less maintenance and refilling in the case of a leak if the component 301 is immersed in reactor coolant, as the reactor coolant surrounding the component 301 may provide make-up damper fluid by flowing into chamber 320 through the leak.

Piston 330 may be attached to and/or abut a second nuclear component having unwanted vibration or relative motion with the component 301. As the second nuclear component contacts or moves rigidly with piston 330, fluid in fluid chamber 320 may damp movement and vibration between component 301 and the second component. Example embodiment damping device 300 may damp vibration and movement between two components in close proximity and/or without using an additional housing, while still reducing a risk of coolant fouling from incompatible damper fluid leakage.

Example embodiment devices may be used to damp vibration among and/or reduce relative movement between any nuclear reactor components. The following example method illustrates a potential use of example embodiment devices to damp vibration in a BWR jet pump.

Figure 4:
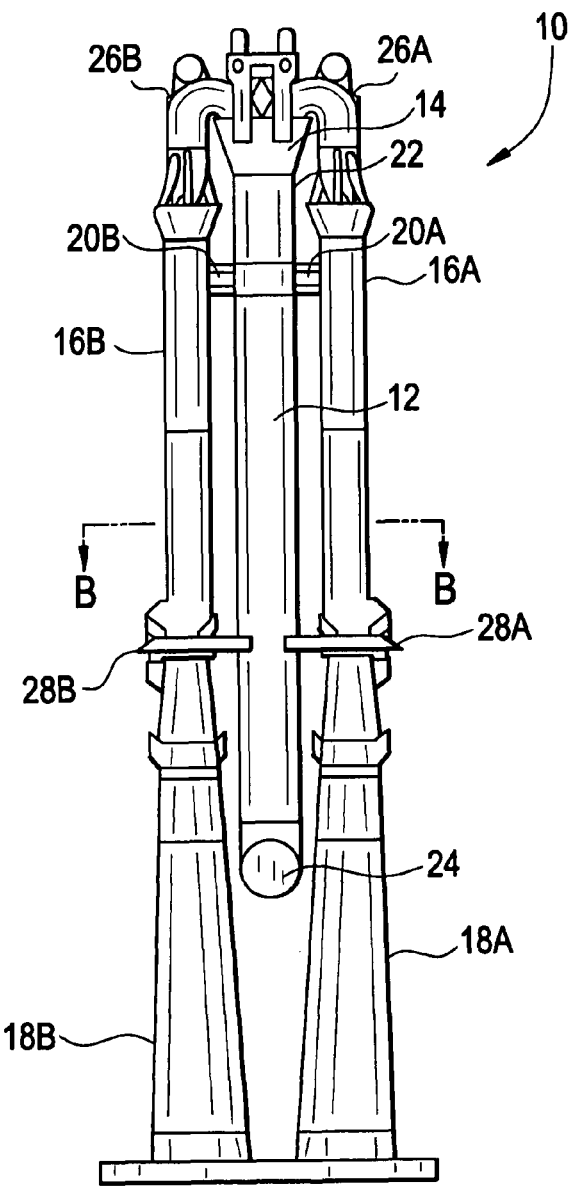
FIG. 4 is an illustration of a conventional Boiling Water Reactor (BWR) jet pump assembly.

FIG. 4 is a side view of a conventional boiling water nuclear reactor jet pump assembly 10. Water may flow through jet pump assembly 10 and into the reactor core (not shown). Jet pump assembly 10 may include a riser assembly 12, a transition assembly 14, two inlet mixer assemblies 16A and 16B, and two diffuser assemblies 18A and 18B. Particularly, riser assembly 12 may be supported by riser braces 20A and 20B, which couple riser 12 to the reactor vessel (not shown). Transition assembly 14 may be coupled to the upper end 22 of riser 12 to split the flow of water into two paths, one through inlet mixer 16A and the other through inlet mixer 16B. Water may enter riser assembly 12 through jet pump inlet nozzle 24. Inlet mixers 16A and 16B may be coupled at one end to transition piece 14 by elbows 26A and 26B respectively, and at an opposite end to jet pump diffuser assemblies 18A and 18B respectively via a slip fit. For support and to prevent pipe vibrations, restrainer brackets 28A and 28B may couple inlet mixer assemblies 16A and 16B to riser pipe 12.

Figure 5:
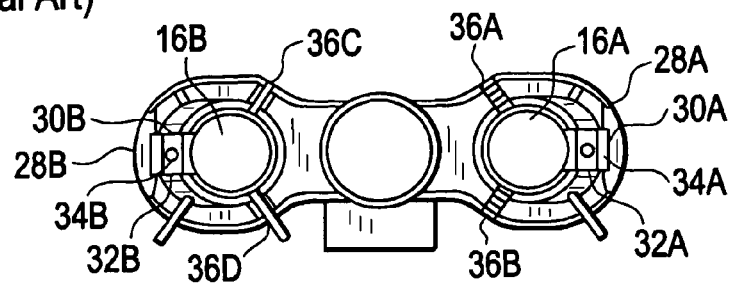
FIG. 5 is a cross section of the jet pump assembly in FIG. 4.

As shown in FIG. 5, wedges 30A and 30B may be conventionally positioned between restrainer brackets 28A and 28B and inlet mixers 16A and 16B by wedge brackets 32A and 32B, respectively. Wedge bolts 34A and 34B may couple wedges 30A and 30B to wedge brackets 32A and 32B, respectively, and may be conventionally configured to permit wedges 30A and 30B to slide on bolts 34A and 34B. Screw contacts 36A, 36B, 36C, and 36D extend through restrainer brackets 28A and 28B and contact mixers 16A and 16B respectively to provide a tight rigid fit up. Screw contacts 36A and 36B may be each located 120 degrees away from wedge 30A in restrainer bracket 28A, and screw contacts 36C and 36D may be each located 120 degrees from wedge 30B in restrainer bracket 28B. Conventionally, set screws 36A, 36B, 36C, and 36D are tack welded to restrainer brackets 28A and 28B to prevent set screws 36A, 36B, 36C, and/or 36D from loosening. However, because of the severe conditions present in the reactor vessel, combined with insufficient wedge support, the tack welds may fail. This may permit set screws 36A, 36B, 36C, and/or 36D to loosen which will destroy the tight rigid fit-up of inlet mixers 16A and 16B in restrainer brackets 28A and 28B. Without a rigid fit-up, inlet mixers 16A and 16B may vibrate which is an undesirable condition.

Figure 6:
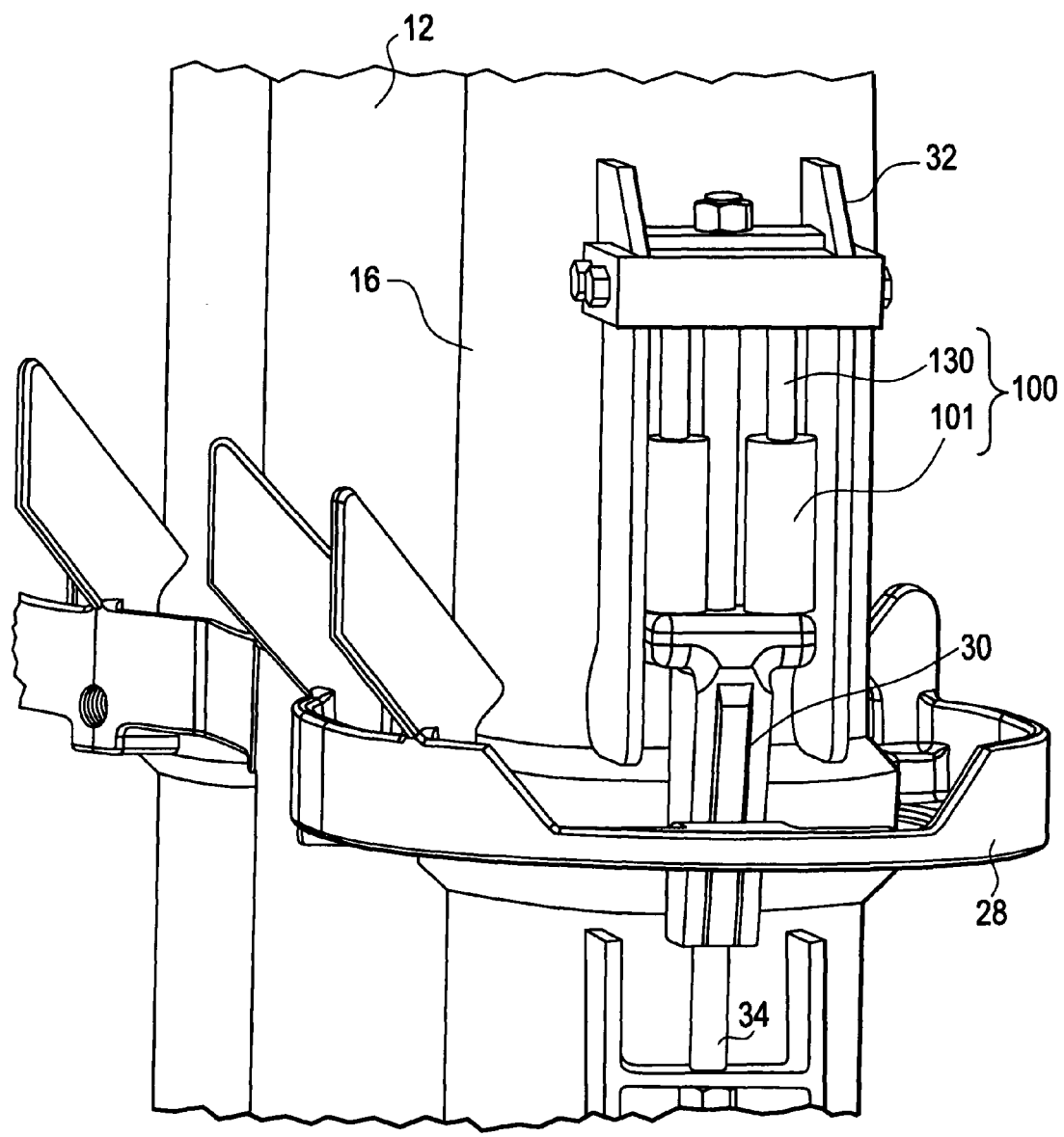
FIG. 6 is an illustration of an example embodiment damping device used in a first example configuration with a jet pump assembly.

As shown in FIG. 6, example embodiment damping devices may be used instead of and/or in addition to wedge 30 and wedge bolt 34. For example, example embodiment damping device 100 (shown in FIG. 1), or any other example embodiment, may be attached between wedge bracket 32 and wedge 30 at either mounting hole 106 and 105 (not shown). In this way, example device 100 may secure a rigid fit, and reduce relative motion, between inlet mixer 16, wedge 30, and/or restrainer bracket 28 while damping vibration in the restrainer bracket 28 and inlet mixer 16. Because the inlet mixer 16A and example embodiment 100 may be surrounded and immersed in reactor coolant, example embodiment damping device 100 may use this coolant as damping fluid without risk of incompatible fluid leakage into the reactor.

Figure 7:
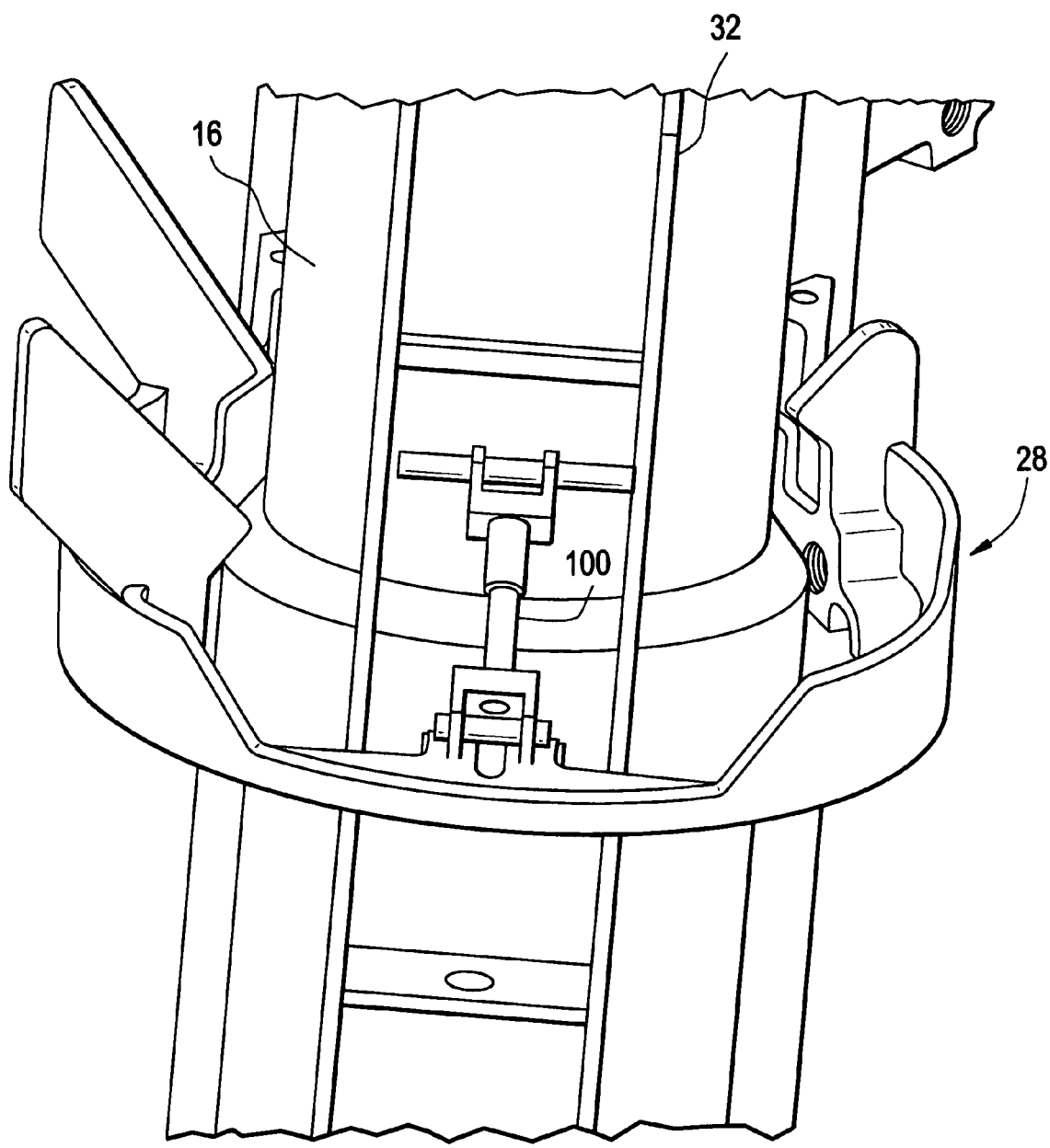
FIG. 7 is an illustration of an example embodiment damping device used in a second example configuration with a jet pump assembly.

Alternatively, as shown in FIG. 7, wedges may be replaced entirely by example embodiment damping devices. An example embodiment damping device 100 may be secured between a restrainer bracket 28 and wedge bracket 32 to secure a rigid fit, and reduce relative motion, between inlet mixer 16 and restrainer bracket 28 while damping vibration in the restrainer bracket 28 and inlet mixer 16

Further, example embodiment damping devices may entirely replace restrainer bracket 28A and associated components, and attach between two inlet mixers 16A and 16B, and/or connect to the riser (12) so as to secure the two inlet mixers relative to each other and damp vibration between inlet mixers 16A and 16B.

Alternatively, example embodiment damping device 300 (shown in FIG. 3) may be implemented in set screws 36A-D. For example, component 301 (FIG. 3) may be a set screw body 36A, and piston 330 may abut an inlet mixer 16A at the end of set screw 36A. In this way, example device 300 may secure a rigid fit, and reduce relative motion, between set screw 36A and inlet mixer 16A while damping vibration in the set screw 36A and inlet mixer 16A. Because the screw 36A and inlet mixer 16A may be surrounded and immersed in reactor coolant, example embodiment damping device 300 may use this coolant as damping fluid without risk of incompatible fluid leakage into the reactor.

Example embodiments thus being described, it will be appreciated by one skilled in the art that example embodiments may be varied through routine experimentation and without further inventive activity. For example, pistons used in example embodiments may take on a variety of shapes and sizes, such as a hollow interior housing, so long as they are still capable of functioning as a moving piston. Variations are not to be regarded as departure from the spirit and scope of the exemplary embodiments, and all such modifications as would be obvious to one skilled in the art are intended to be included within the scope of the following claims.

What is claimed is:

1. A damping device for use when immersed in liquid coolant in an operating nuclear reactor, the device comprising:
    a piston configured to attach to a first component immersed in liquid coolant in the operating nuclear reactor, the piston including at least one fluid passage;
    a housing capturing the piston and configured to attach to a second component immersed in liquid coolant in the operating nuclear reactor, the piston and the housing fabricated of a material substantially maintaining its physical properties in the operating nuclear reactor, the housing being divided into first and second fluid chambers by a head of the piston, the head of the piston being flush with the housing about an outer circumference of the head of the piston; and
    a damping fluid in the housing damping movement between the piston and housing and flowing through the at least one fluid passage, the damping fluid being chemically compatible with the coolant fluid in the operating nuclear reactor.

2. The damping device of claim 1, further comprising:
    at least one spring within the housing, the at least one spring connected between the piston and the housing so as to damp movement between the piston and the housing.

3. The damping device of claim 1, further comprising:
    a first spring in the first fluid chamber within the housing; and
    a second spring in the second fluid chamber within the housing, the first and second springs connected between the piston and the housing so as to damp movement between the piston and the housing.

4. A damping device for use when immersed in liquid coolant in an operating nuclear reactor, the device comprising:
    a piston configured to attach to a first component immersed in liquid coolant in the operating nuclear reactor, the piston including at least one fluid passage, the piston including a shaft having a first mounting hole configured to directly attach to the first component;
    a housing capturing the piston and configured to attach to a second component immersed in liquid coolant in the operating nuclear reactor, the piston and the housing fabricated of a material substantially maintaining its physical properties in the operating nuclear reactor, the housing including a second mounting hole configured to directly attach to the second component at an end of the housing; and a damping fluid in the housing damping movement between the piston and housing and flowing through the at least one fluid passage, the damping fluid being chemically compatible with the coolant fluid in the operating nuclear reactor.

5. The damping device of claim 1, wherein the first component is a first jet pump inlet mixer and the second component is at least one of a restrainer bracket, a set screw, a second jet pump inlet mixer, and jet pump riser.

6. A method of damping vibration and relative movement between a first and a second component immersed in liquid coolant in a nuclear reactor during operation, the method comprising:

attaching a piston to a first component in the nuclear reactor, the piston including at least one fluid passage, the piston including a shaft having a first mounting hole configured to directly attach to the first component; and attaching a housing to the second component in the nuclear reactor, the housing capturing the piston, the housing including a damping fluid damping movement between the piston and housing and flowing through the at least one fluid passage, the damping fluid being chemically compatible with the coolant fluid in the operating nuclear reactor, the piston and the housing fabricated of a material substantially maintaining its physical properties in the operating nuclear reactor, and the housing being divided into first and second fluid chambers by a head of the piston, the head of the piston being flush with the housing about an outer circumference of the head of the piston.

7. The method of claim 6, wherein the first component is a first jet pump inlet mixer and the second component is at least one of a restrainer bracket, a set screw, a second jet pump inlet mixer, and jet pump riser.

8. The clamping device of claim 1, wherein the damping fluid is a same fluid as the coolant fluid.

9. The clamping device of claim 1, wherein the damping fluid is demineralized water.

10. The clamping device of claim 1, wherein the head of the piston includes a plurality of fluid passages, each of the fluid passages passing through and defined only by the head of the piston, wherein the damping fluid is sealed within the housing and damps movement between the piston and housing by flowing only through the plurality of fluid passages, and wherein the piston includes a shaft that extends from inside the housing to outside the housing.

\* \* \* \* \*